(12) United States Patent
Chun et al.

(10) Patent No.: US 12,124,298 B2
(45) Date of Patent: Oct. 22, 2024

(54) ROLLABLE MOBILE TERMINAL

(71) Applicant: LG ELECTRONICS INC., Seoul (KR)

(72) Inventors: Sehoon Chun, Seoul (KR); Bumoh Park, Seoul (KR); Junghyun Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 189 days.

(21) Appl. No.: 17/598,125

(22) PCT Filed: Mar. 26, 2019

(86) PCT No.: PCT/KR2019/003470
§ 371 (c)(1),
(2) Date: Sep. 24, 2021

(87) PCT Pub. No.: WO2020/196941
PCT Pub. Date: Oct. 1, 2020

(65) Prior Publication Data
US 2022/0187874 A1   Jun. 16, 2022

(51) Int. Cl.
*G06F 1/16* (2006.01)
*H04M 1/02* (2006.01)

(52) U.S. Cl.
CPC .......... *G06F 1/1652* (2013.01); *G06F 1/1616* (2013.01); *G06F 1/1681* (2013.01); *H04M 1/0216* (2013.01); *H04M 1/0268* (2013.01)

(58) Field of Classification Search
CPC .... G06F 1/1652; G06F 1/1616; G06F 1/1681; H04M 1/0216; H04M 1/0268; H04M 1/0237; H04M 1/0208
See application file for complete search history.

(56) References Cited

U.S. PATENT DOCUMENTS 8,516,728 B2 * 8/2013 Jung ............... G09F 9/301
                                              40/607.01
9,772,657 B2 * 9/2017 Takayanagi ......... H04M 1/0268
(Continued)

FOREIGN PATENT DOCUMENTS

KR   10-2016-0129947 A   11/2016
KR   10201700050270 A    5/2017
(Continued)

*Primary Examiner* — Abhishek M Rathod
(74) *Attorney, Agent, or Firm* — Birch, Stewart, Kolasch & Birch, LLP

(57) ABSTRACT

A rollable mobile terminal comprises: a rolling part bent in a first direction and comprising a flexible display unit and a flexible frame which is bent and located on the rear surface of the flexible display unit; a first body having a cylindrical accommodation part in which one side of the rolling part in the first direction is rolled and stored, and an opening formed in one side thereof through which the rolling part enters and is withdrawn; and a second body to which the other side of the rolling part in the first direction is coupled, wherein the rollable mobile terminal can be changed into a state in which the rolling part is accommodated in the first body, and the first body and the second body are closed, or a state in which the rolling part is withdrawn to the outside and the first body and the second body are separated from each other and open, and, even when the flexible display unit is unrolled, the flexible display unit is stably supported such that a display device is supported and a touch input or the like is possible even when a user holds the rollable mobile terminal with one hand.

17 Claims, 11 Drawing Sheets

(56) References Cited

U.S. PATENT DOCUMENTS

| | | | | |
|---|---|---|---|---|
| 9,864,412 B2* | 1/2018 | Park | | G06F 1/1652 |
| 10,135,018 B2* | 11/2018 | Seo | | G09F 9/301 |
| 10,146,260 B2* | 12/2018 | Lee | | G06F 1/1652 |
| 10,314,183 B2* | 6/2019 | Heo | | H05K 5/0217 |
| 10,416,722 B2* | 9/2019 | Cho | | G06F 1/1656 |
| 11,493,952 B2* | 11/2022 | Mehandjiysky | | G06F 1/1686 |
| 2005/0040962 A1* | 2/2005 | Funkhouser | | G09F 9/301 |
| | | | | 340/815.4 |
| 2005/0041012 A1* | 2/2005 | Daniel | | G06F 1/1601 |
| | | | | 345/156 |
| 2008/0212271 A1* | 9/2008 | Misawa | | G09F 9/35 |
| | | | | 361/679.01 |
| 2010/0177020 A1* | 7/2010 | Bemelmans | | G09F 9/301 |
| | | | | 345/55 |
| 2011/0193829 A1* | 8/2011 | Tsai | | G09F 9/30 |
| | | | | 345/204 |
| 2011/0227822 A1* | 9/2011 | Shai | | G06F 1/1656 |
| | | | | 345/156 |
| 2012/0204453 A1* | 8/2012 | Jung | | G09F 9/301 |
| | | | | 40/517 |
| 2016/0034000 A1* | 2/2016 | Lee | | G06F 1/1652 |
| | | | | 361/749 |
| 2016/0163242 A1* | 6/2016 | Lee | | G09F 9/301 |
| | | | | 40/584 |
| 2016/0187929 A1* | 6/2016 | Kim | | G06F 1/1643 |
| | | | | 345/184 |
| 2016/0231843 A1* | 8/2016 | Kim | | G06F 3/0412 |
| 2016/0363960 A1* | 12/2016 | Park | | G09F 15/0062 |
| 2016/0374228 A1* | 12/2016 | Park | | G09F 9/301 |
| 2017/0023978 A1* | 1/2017 | Cho | | H04M 1/0268 |
| 2017/0060183 A1* | 3/2017 | Zhang | | G06F 1/1615 |
| 2017/0212607 A1* | 7/2017 | Yoon | | G06F 3/147 |
| 2018/0077808 A1 | 3/2018 | Seo et al. | | |
| 2018/0198899 A1* | 7/2018 | Lee | | H04M 1/0268 |
| 2019/0064578 A1* | 2/2019 | Cho | | H10K 77/111 |

FOREIGN PATENT DOCUMENTS

| | | |
|---|---|---|
| KR | 10-2017-0062343 A | 6/2017 |
| KR | 10-2018-0025358 A | 3/2018 |

* cited by examiner (a)

(b)

(a)

(c)

ROLLABLE MOBILE TERMINAL

CROSS REFERENCE TO RELATED APPLICATIONS

This application is the National Phase of PCT International Application No. PCT/KR2019/003470, filed on Mar. 26, 2019, which is hereby expressly incorporated by reference into the present application.

TECHNICAL FIELD

The present disclosure relates to a mobile terminal having a rollable display.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

A display device is a device that has the ability to receive, process, and display images that users can view. The display device, for example, receives a user-selected broadcast in a broadcast signal transmitted from a broadcasting station, separates an image signal from the received signal, and displays the separated image signal on a display.

Recently, owing to the development of broadcasting and network technologies, the functionality of a display device has been diversified considerably, and performance of the device has been improved accordingly. In other words, display devices have evolved to provide users with a variety of other contents, not just broadcast contents. For example, a display device can provide gameplay, music appreciation, Internet shopping, and user customized information using various applications as well as programs received from broadcasting stations. To perform these extended functions, a display device is essentially connected to other devices or networks using a variety of communication protocols, and can provide a user with ubiquitous computing. In other words, display devices have evolved into smart devices that enable network connectivity and ubiquitous computing.

Meanwhile, a flexible display having sufficient elasticity to enable great deformation has recently been developed. Such a flexible display can be deformed enough to be rollable. A mobile terminal accommodates a rolled flexible display and can protrude the display to an outside of a body in a desired size. Thus, a mobile terminal can have a more compact structure by using a flexible display. In addition, by including such a rollable display, the mobile terminal can be referred to as a rollable mobile terminal.

In order to use such a rollable mobile terminal, the display can be withdrawn from the body and, at the same time, the display can be extended to a user-desired size. However, the display can be extended in various directions by the user, and the relative orientation or disposition of the display for the user can be also changed depending on the direction of the extension. Therefore, in order to show an intended content or screen to the user, the mobile terminal needs to orient the content or screen on the display above in consideration of the changed display or the relative orientation of the user. Furthermore, the mobile terminal needs to further adjust the oriented content by considering the extended direction and orientation.

DISCLOSURE OF THE INVENTION

Technical Task

One technical task of the present disclosure is to provide a rollable mobile terminal provided with a support structure capable of stably supporting a flexible display unit when the flexible display is spread or unrolled.

Another technical task of the present disclosure is to provide a rollable display device provided with a sliding structure capable of compensating for a length difference due to a curvature radius difference between a display unit and a support structure.

Technical Solutions

In one technical aspect of the present disclosure, provided is a rollable mobile terminal including a rolling part including a flexible display unit and a flexible frame located on a backside of the flexible display unit, the rolling part flexed in a first direction, a first body including a receiving part configured in a cylindrical shape so that one side of the rolling part in the first direction is rolled up and received therein and an opening formed in one side so that the rolling part is inserted or withdrawn through the opening, and a second body coupled with the other side of the rolling part in the direction, wherein the rollable mobile terminal may be switchable to a closed state that the rolling part is received in the first body and that the first body and the second body are closed or an open state that the rolling part is withdrawn externally and that the first body and the second body are spaced apart from each other.

The flexible display unit may include a display panel outputting an image and a back plate coupled to a backside of the display panel and the rollable mobile terminal may include a fastening part fastening the flexible frame and the back plate together to enable the flexible display unit to slidably move in the first direction.

The fastening part may include a long hole extended long in the first direction and a fastening pin inserted in the long hole.

The fastening part may include a bending part extended from both end portions in the second direction to enclose a lateral side of the flexible frame.

The rollable mobile terminal may further include an elastic member inserted between the second body and the back plate to pull the back plate in a direction of the second body.

The flexible frame may include a plurality of unit frames extended in the second direction and disposed side by side in the first direction and a plurality of hinge pins connecting a plurality of the unit frames in between, respectively.

The flexible frame may further include a plate-type fixed frame located on an end portion of the other side in the first direction and the fixed frame may be fastened to the second body.

The rollable mobile terminal may include a first sawteeth formed on a backside of each of a plurality of the unit frames, a gear part located at the gear first body and comprising a second sawteeth engaging with the first sawteeth to rotate, and a motor providing a rotational force to the gear part.

The rollable mobile terminal may further include a guide rail formed on at least one of a top side and a bottom side of the receiving part in the cylindrical shape to guide a moving direction of the rolling part by being slidably coupled to both end portions of the rolling part in the second direction, and the guide rail may be configured in a circular or spiral shape.

The rollable mobile terminal may further include a support part having one end coupled to the first body and the other end coupled to the second body to support a backside of the flexible frame.

The support part may include a plurality of links and a hinge coupled between a plurality of the links to vary an angle in between.

The support part may be folded in the closed state in a manner that a plurality of the links are extended in a second direction and disposed side by side in the first direction, and the support part may be unfolded in the open state in a manner that the link is extended and unfolded in the first direction.

The first body may include an opening configured to expose a portion of the flexible display unit in the closed state, and state information of the mobile terminal, time information or user-set information may be outputted to a position exposed through the opening.

The receiving part in the cylindrical shape may include a first receiving part located on an outer circumference to receive the rolling part therein and a second receiving part located inside the first receiving part to receive a battery therein.

The rollable mobile terminal may further include a speaker hole formed in at least one side of the first body in the second direction and an audio output unit received in the second receiving part to output sound through the speaker hole.

Advantageous Effects

According to at least one embodiment of a rollable mobile terminal of the present disclosure, as a flexible display unit is stably supported even in an unrolled state, a display device is supported with one hand and a touch input and the like can be performed.

In addition, it is able to compensate for a length tolerance generated between a rolled state and an unrolled state, thereby solving a problem that a display unit is cleaved, loosened or broken.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BEST MODE FOR INVENTION

Figure 1:
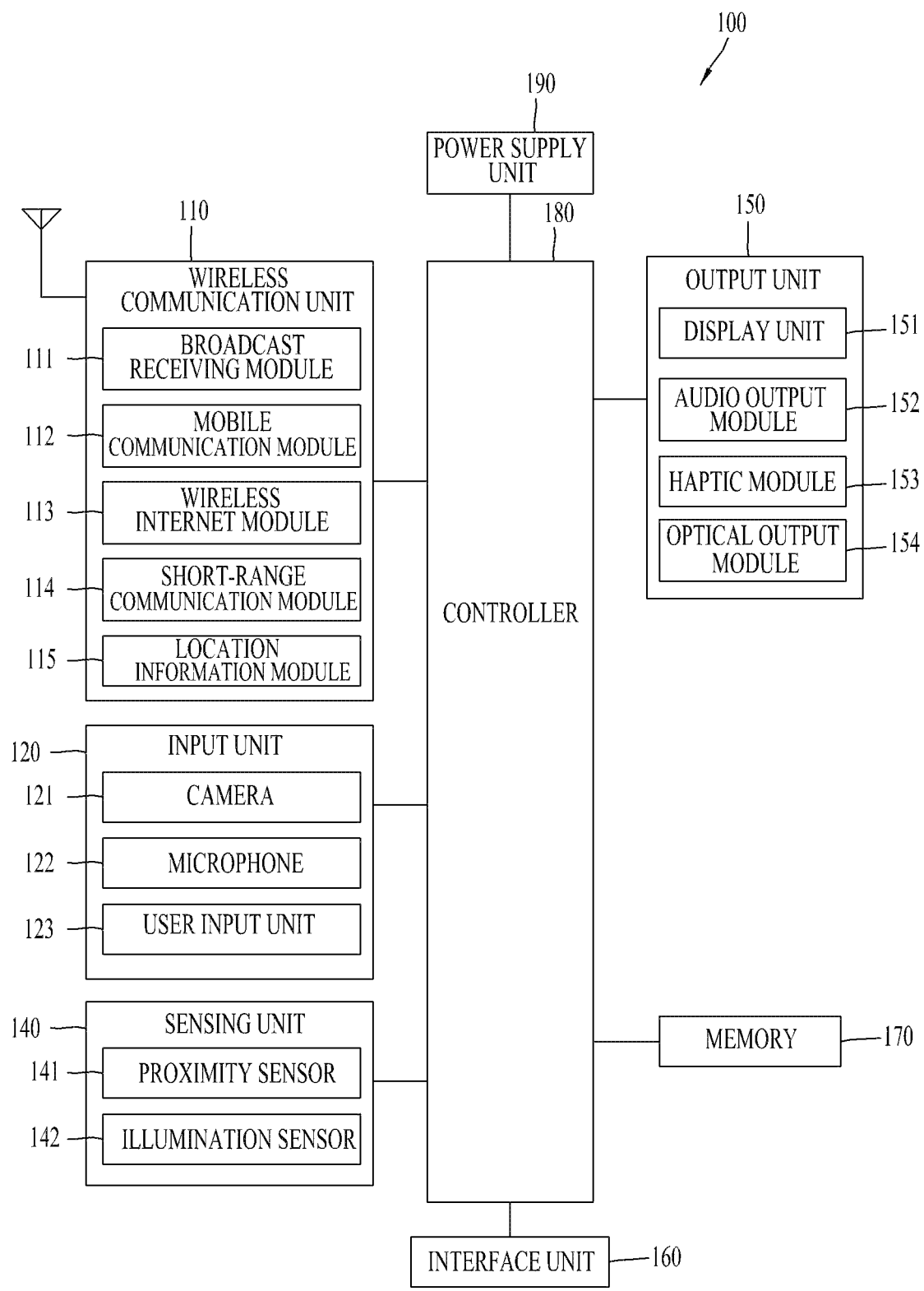
FIG. 1 is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1A, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1A. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Figure 2:
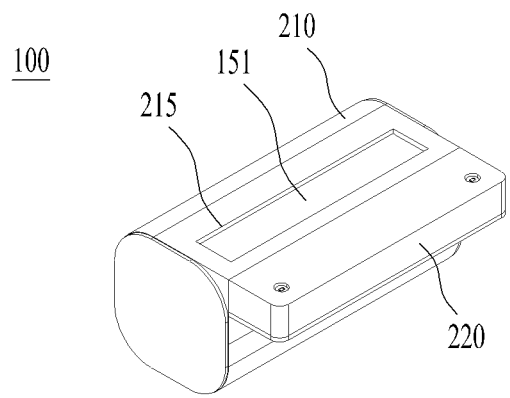
FIG. 2 is a perspective diagram showing a closed state and an open state of a mobile terminal according to the present disclosure, viewed from one side.
Figure 2:
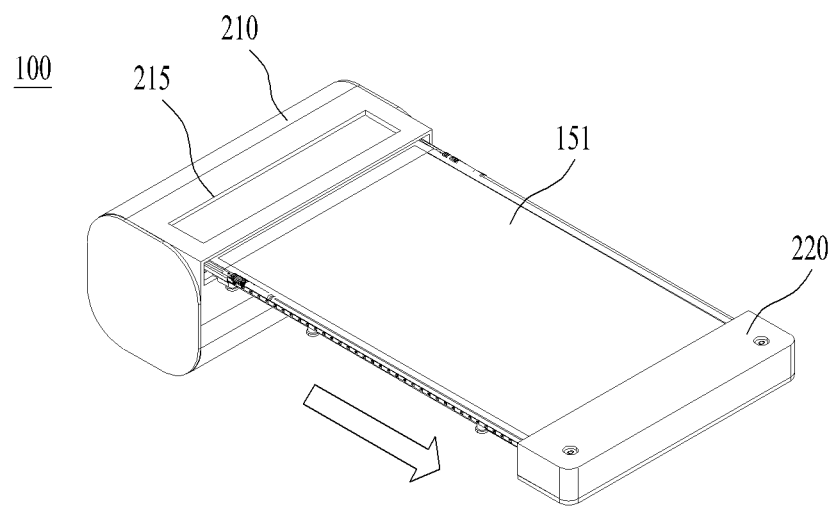

FIG. 2 is a perspective diagram of a mobile terminal 100 according to one embodiment of the present disclosure. Particularly, FIG. 2 (*a*) shows a closed state of the mobile terminal 100 according to one embodiment of the present disclosure and FIG. 2 (b) shows an open state of the mobile terminal 100 according to one embodiment of the present disclosure.

According to one embodiment of the present disclosure, provided is a mobile terminal 100 enabling a user to easily adjust an exposed size of a display unit 151 displaying a screen. As the display unit 151 is flexed to extend or reduce an externally exposed area.

The display unit 151 may be a type of display that is deformable by an external force. This deformation, which includes display unit 151 and other components of mobile terminal 100, may include any of curving, bending, folding, twisting, rolling, and combinations thereof. The deformable display unit 151 may also be referred to as a "flexible display unit." In some implementations, the flexible display unit 151 may include a general flexible display, electronic paper (also known as e-paper), and combinations thereof.

The flexible display of mobile terminal 100 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 151 is not deformed (for example, in a state with an infinite radius of curvature and referred to as a first state), a display region of the flexible display unit 151 includes a generally flat surface. When in a state that the flexible display unit 151 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 151 may be a curved state (for example, a state of being curved from up to down or from right to left), instead of being in flat state. In this embodiment, when an external force is applied to the flexible display unit 151, the flexible display unit 151 may transition to the second state such that the flexible display unit is deformed into the flat state (or a less curved state) or into a more curved state.

If desired, the flexible display unit 151 may implement a flexible touch screen using a touch sensor in combination with the display. When a touch is received at the flexible touch screen, the controller 180 (shown in FIG. 1) can execute certain control corresponding to the touch input. In general, the flexible touch screen is configured to sense touch and other input while in both the first and second states.

One option is to configure the mobile terminal 100 to include a deformation sensor which senses the deforming of the flexible display unit 151. The deformation sensor may be included in the sensing unit 140.

The deformation sensor may be located in the flexible display unit 151 or the body 210, 220 to sense information related to the deforming of the flexible display unit 151. Examples of such information related to the deforming of the flexible display unit 151 may be a deformed direction, a deformed degree, a deformed position, a deformed amount of time, an acceleration that the deformed flexible display unit 151 is restored, and the like. Other possibilities include most any type of information which can be sensed in response to the curving of the flexible display unit or sensed while the flexible display unit 151 is transitioning into, or existing in, the first and second states.

In some embodiments, controller 180 or other component can change information displayed on the flexible display unit 151, or generate a control signal for controlling a function of the mobile terminal 100, based on the information related to the deforming of the flexible display unit 151. Such information is typically sensed by the deformation sensor.

A battery (not shown in this figure) located in the mobile terminal 100 may also be deformable in cooperation with the flexible display unit 151, taking into account the characteristic of the flexible display unit 151. One technique to implement such a battery is to use a stack and folding method of stacking battery cells. Alternatively, it may be provided inside of a rolling part within the first body 210.

Namely, the mobile terminal 100 according to one embodiment of the present disclosure includes a first body 210 having various electronic components installed therein and a rolling part received in the first body 210 in a closed state or exposed to an outside of the first body 210 in an open state. The rolling part includes a flexible display unit 151 and a flexible frame 230 supporting a backside of the flexible display unit 151. The flexible frame 230 may be rolled or unrolled together with the flexible display unit 151.

A second body 220 may be further included. One side of the rolling part in a first direction is received in the second body 220 in a manner of being wound around the first body 210, and the other side is fixed to the second body 220. Since the rolling part is received in the first body 210, the first body 210 may be configured in a size bigger than the second body 220. The size of the first body 210 may vary depending on the number of winding of the rolling part, a curvature radius and a size of a component installed inside. Electronic components may be installed in the second body 220. A user may withdraw the rolling part from the first body 210 in a manner of holding the second body 220 and puling it in the first direction. Alternatively, in case that a separate motor 252 is included, the rolling part may switch to an open state from a closed state in a manner of moving in the first direction without a user's external force.

In one embodiment of the present disclosure, the closed state of the mobile terminal 100 means a state that the rolling part is received in the first body 210 and that the first body 210 and the second body 220 contact with each other and the open state means a state that the rolling part has been withdrawn from the first body 210. In the closed state, the flexible display unit 151 is received and deactivated. In the open state, the flexible display unit 151 is exposed externally and activated. Even in the closed state, as shown in FIG. 2 (a), the flexible display unit 151 may be partially exposed to an outside through an opening 215 formed in one side of the first body 210. Hence, hour, date, notification and the like may be displayed on the partially exposed portion or a volume button, a stop button and the like guiding the playback are outputted from the partially exposed portion in the course of playing music or the like. Thus, some information may be obtained or controlled even in the closed state. A plurality of the openings may be formed in various shapes such as circles, squares and the like. Since a portion of the flexible display overlapping with the opening varies depending on a withdrawn extent of the rolling part, a position of an image outputted from the display unit 141 may change.

As shown in FIG. 2 (*b*), an area of the flexible display exposed externally on withdrawal may be fixed only in a state of being fully withdrawn or extended step by step. Hence, the open state includes a partially withdrawn state as well as a fully withdrawn state.

Figure 3:
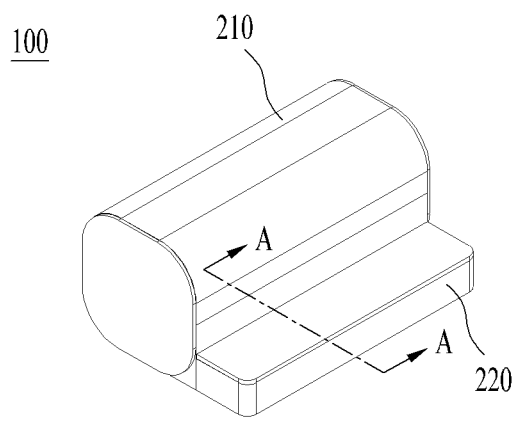
FIG. 3 is a perspective diagram showing a closed state and an open state of a mobile terminal according to the present disclosure, viewed from another side.
Figure 3:
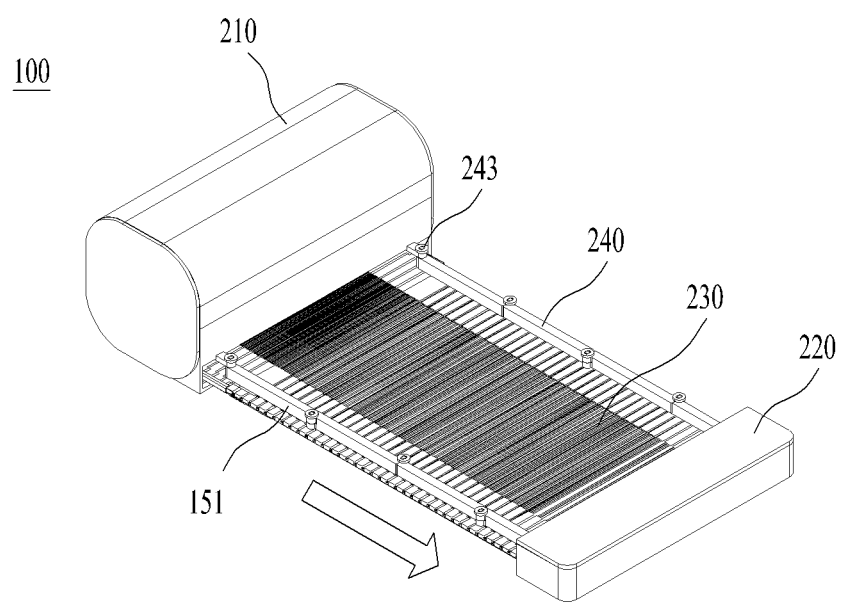

FIG. 3 is a perspective diagram of the mobile terminal 100 shown in FIG. 2, viewed from an opposite side. FIG. 2 and FIG. 3 show an embodiment that the flexible display unit 151 is wound to be located outside when the rolling part is received in the first body 210. On the other hand, the flexible display unit 151 may be wound to be located inside and the flexible frame 230 may be located outside. In this case, the side viewed in the direction of FIG. 2 (*b*) becomes the flexible frame 230, whereas the side viewed in the direction of FIG. 3 (*b*) is the flexible display unit 151.

For clarity and convenience of description, a side on which the flexible display unit 151 is located may be referred to as a front side and a side on which the flexible frame 230 shown in FIG. 3 is located may be referred to as a backside. Since a size of the first body 210 differs from that of the second body 220, the first and second bodies 210 and 220 may be disposed to form the same plane in the closed state but the backside may have a step difference between the first and second bodies 210 and 220 like FIG. 3 (*a*).

As shown in FIG. 3 (*b*), regarding a backside of the mobile terminal 100 in the open state, the flexible frame 230 located on the backside of the rolling part is exposed. A support part 240 may be further included to fix the rolling part to the withdrawn state. A length of the support part 240 may be extended depending on a withdrawn extent of the rolling part.

Figure 4:
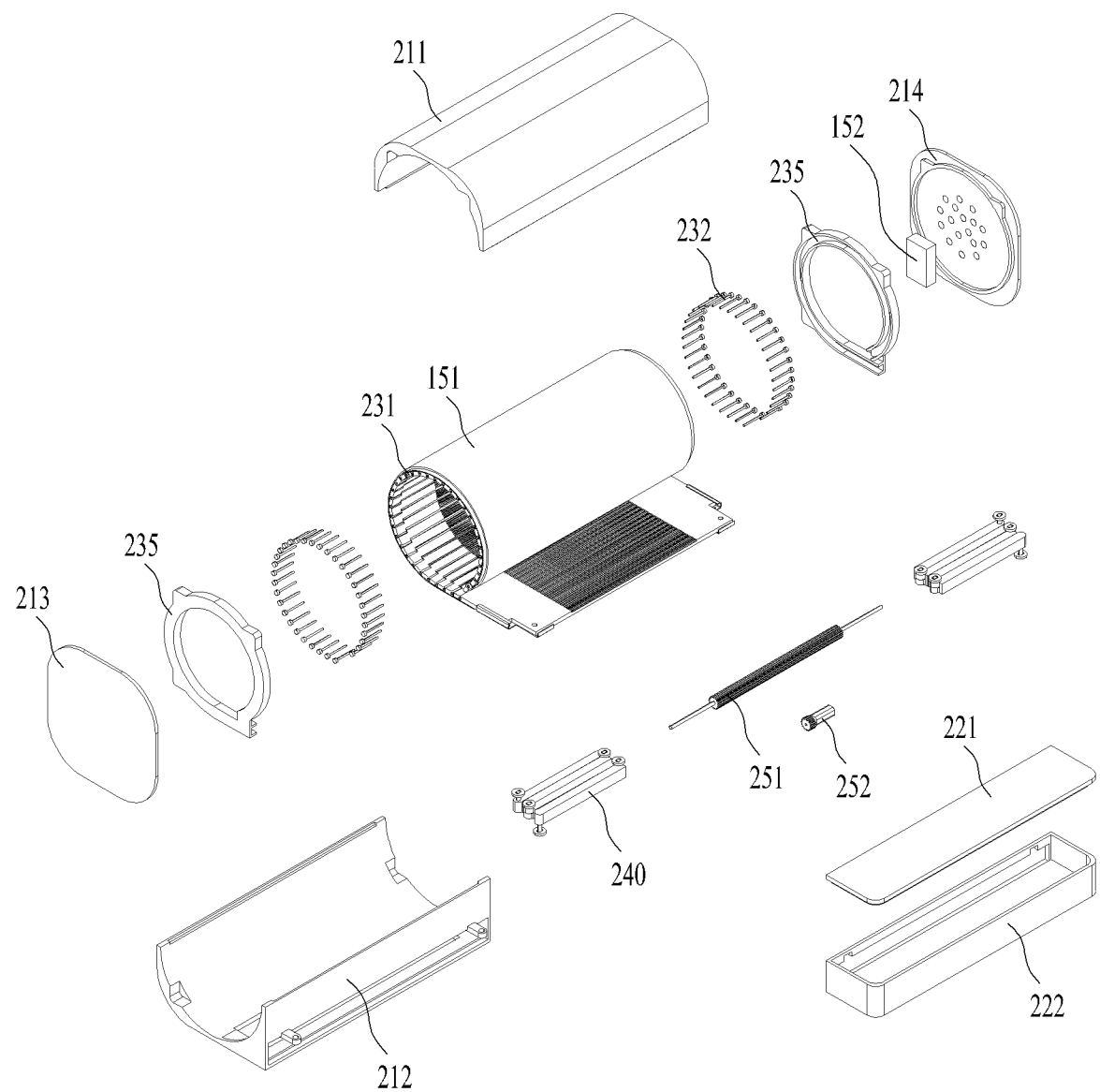
FIG. 4 is an exploded perspective diagram of a mobile terminal according to the present disclosure.

FIG. 4 is an exploded perspective diagram of the mobile terminal 100 according to the present disclosure. The first body 210 may include a receiving part in a cylindrical shape. Lateral cases 211 and 222 having a curved surface forming a cylindrical lateral side and top and bottom cases 213 and 214 respectively covering top and bottom sides of a cylinder may be included.

The lateral case may include an opening through which the rolling part is inserted or withdrawn, and the opening for the rolling part may be disposed in a coupling part of a pair of the lateral cases. In the closed state, the opening may be blocked by contacting with the second body 220. The receiving part may have a curved surface to enable the rolling part to be wound evenly, but an outer side may differ in curvature to facilitate the mobile terminal to rest. The first body 210 may have the top and bottom case in a rounded rectangular shape, and the lateral case may be configured in a manner that thickness is not uniform, that portions in directions of the front side and the backside are formed thin, and that corner portions are formed thick. A fastening part fastening the top and bottom case and the lateral case may be disposed using the corner portions in which the thickness of the lateral case is formed thick.

The top and bottom case may further include a guide rail 235 provided to both end portions in a second direction vertical to the first direction of the rolling part to guide the rolling part to be received in the receiving part of the first body 210 in a manner of being rolled along a predetermined trace.

Figure 5:
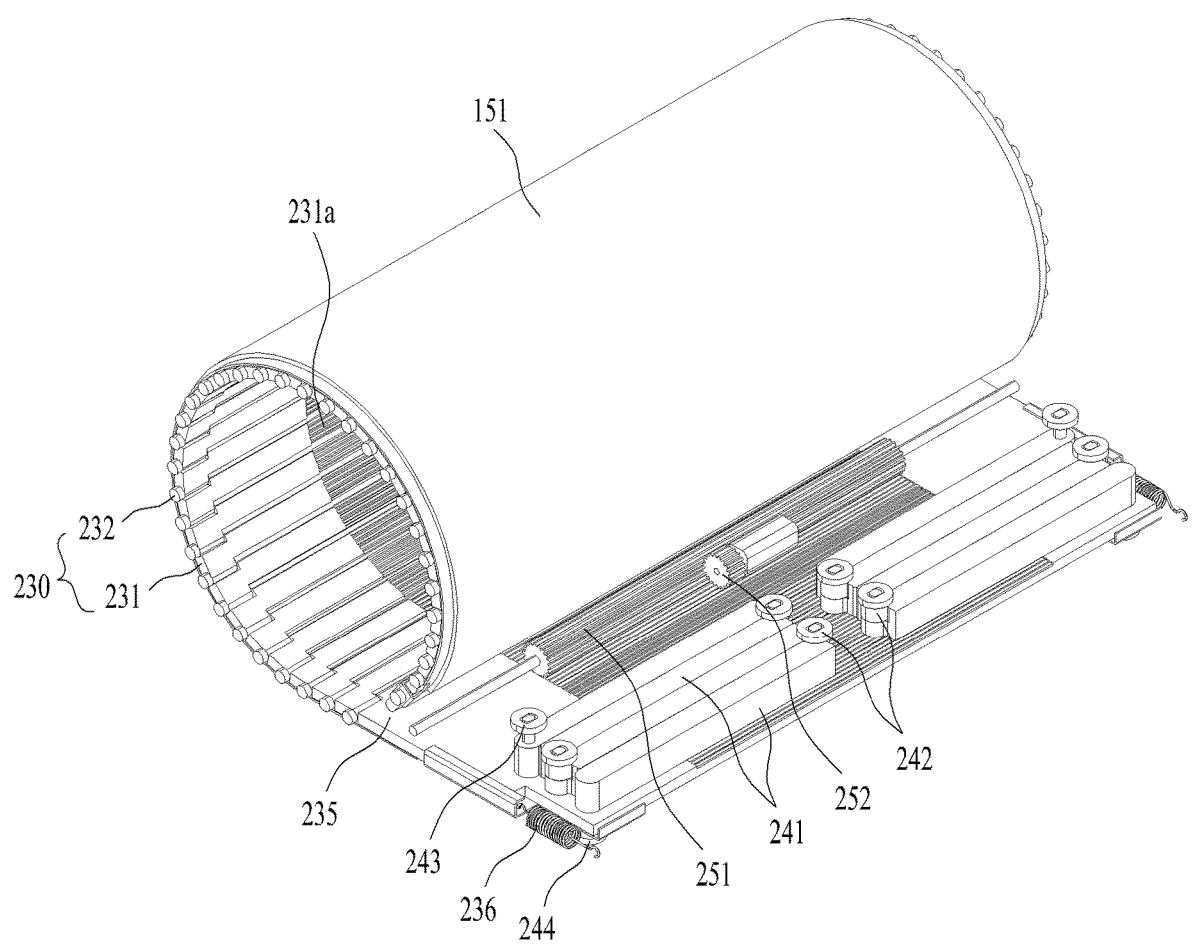
FIG. 5 is a diagram showing a state that a case of a mobile terminal according to the present disclosure is removed.

FIG. 5 is a diagram showing a state that the case of the mobile terminal 100 according to the present disclosure is removed. The rolling part may include the flexible frame 230 supporting the backside of the flexible display unit 151 and flexed or unflexed together with the flexible display unit 151.

To be flexed with rigidity, as shown in FIG. 5, the flexible frame 230 may include a plurality of unit frames 231 and a hinge pin 232 connecting the unit frames 231 together. The unit frames 231 are extended in the second direction, disposed side by side in the first direction, an form a step difference in the second direction. The two unit frames 231 may be connected in a manner that the hinge pin 232 is inserted by penetrating the step difference. As shown in FIG. 5, the hinge pin 232 may be disposed at both end portions of the rolling part in the second direction and received in the aforementioned guide rail 235.

The flexible frame 230 may further include a fixed frame 235 coupled to the second body 220. Since the rolling part located in the second body 220 is not flexible, it may use a plate member without using the unit frame 231. The fixed frame 235 may be fixed to the second body 220 and disposed across the second body 220 and the first body 210.

The flexible display unit 151 may include a display panel 1511 outputting an image and a back plate 1512 supporting a back of the display panel 1511 and coupled to other members. The back plate 1512 may employ a member flexed like a metal plate and having rigidity. The display panel 1511 and the back plate 1512 may be attached together using an adhesive tape or the like. To radiate heat generated from the display panel 1511, the adhesive tape may have heat emission performance.

The rolling part is spread flat or flexed at a prescribed curvature. When the rolling part is rolled up, the flexible display unit 151 located outside and the flexible frame 230 located inside are coupled to be slidably movable in a prescribed distance instead of being fixed to each other. In case that a plurality of members in prescribed thickness are stacked in a thickness direction, the two members may differ from each other in a curvature radius in case of flex deformation. To compensate such tolerance, they may be coupled together to move slidably without being fixedly coupled together.

Figure 6:
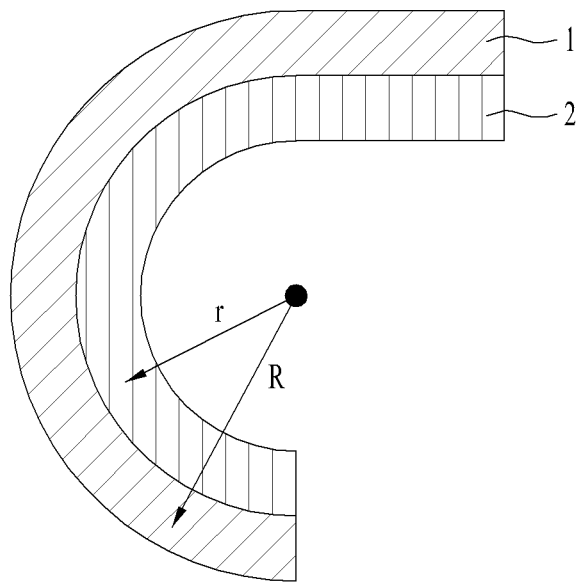
FIG. 6 is a diagram showing a length difference due to a curvature radius depending on flex deformation of a flexible display device.
Figure 6:
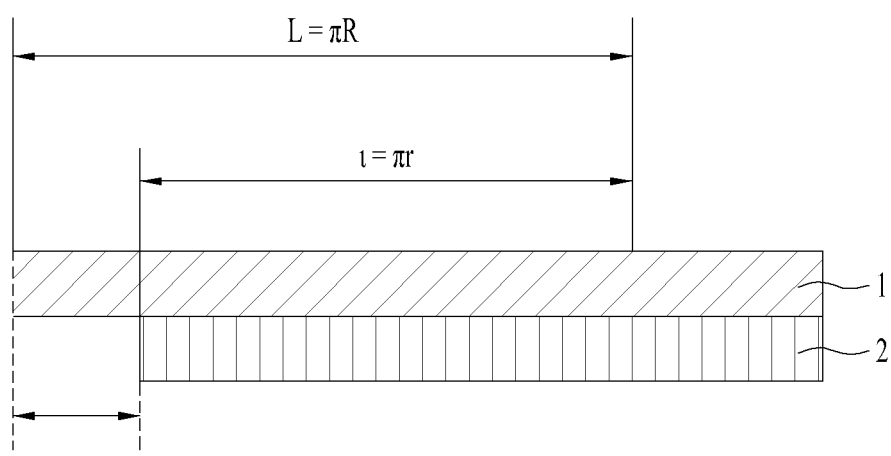

FIG. 6 is a diagram showing a length difference according to a curvature radius of a flexible member. When two flexible members are flexed in a semicircular shape, a length of a first member 1 and a length of a second member 2 may be configured to have the same length. If the first and second members are spread flat, there is a length difference amounting to $\pi(R-r)$. To compensate for such a length difference, a fastening part coupling the flexible display unit 151 and the flexible frame 230 of the present disclosure together to be slidably movable may be included.

Although a length difference may occur between the display panel 1511 and the back plate 1512 of the flexible display unit 151 depending on a presence or non-presence of such flex, a corresponding tolerance is not considerable owing to relatively thin thickness. Besides, since the adhesive tape may contain soft foam material deformable in a prescribed range and the like, it may compensate for the length variation between the display panel 1511 and the back plate 1512 due to the flex deformation of the flexible display unit 151.

Figure 7:
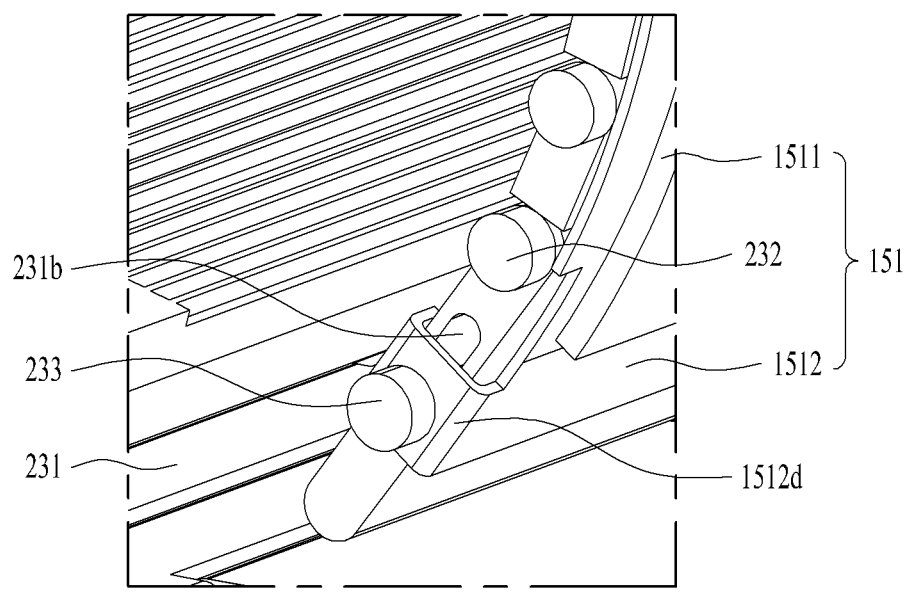
FIG. 7 and FIG. 8 are diagrams to describe a fastening mechanism between a flexible frame and a flexible display in a mobile terminal according to the present disclosure.
Figure 8:
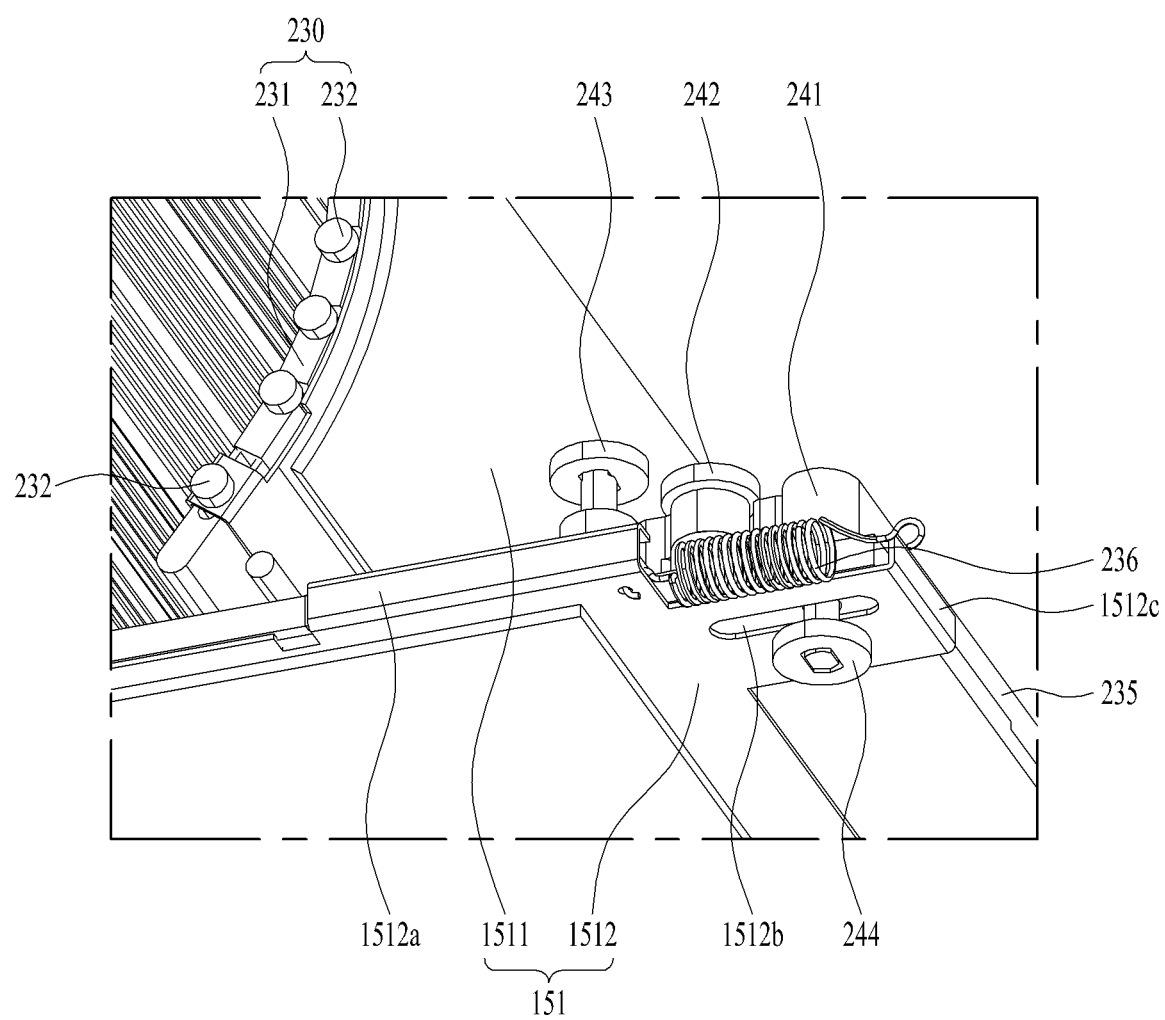

FIG. 7 and FIG. 8 are diagrams to describe the fastening mechanism between the flexible frame 230 and the flexible display in the mobile terminal 100 according to the present disclosure. FIG. 7 shows one end portion of the rolling part located in the first body 210, and FIG. 8 shows the other end portion of the rolling part located in the second body 220.

As shown in FIG. 7, the back plate 1512 of the flexible display unit 151 may include a bending part 1512a enclosing the flexible frame 230 in part. As the bending part 1512a is extended from both end portions of the rolling part in the second direction so as to enclose the flexible frame 2230, thereby allowing the flexible display unit 151 to move in the first direction only with respect to the flexible frame 230 while interrupting a motion in the second direction. In case that a portion enclosed by the bending part 1512a is the unit frame 231, as shown in FIG. 7, it may be formed not to be greater than a width of the unit frame 231 in the first direction.

The fastening part may include a first long hole 231b configured long in the first direction and a first fastening pin 233 inserted in the first long hole 231b. FIG. 7 shows a state that the first long hole 231hb is formed in the flexible frame 230 and that the first fastening pin 233 is fixed to the bending part 1512a of the back plate 1512. Here, the first fastening pin 233 may use a member that is the same kind of the hinge pin 232.

The fastening part may be formed not only at one side of the rolling part in the first direction but also at the other side, and may also compensate lengths at both sides in the first direction. As shown in FIG. 8, a bending part 1512d may be provided to the other side of the back plate 1512 and configured to enclose a lateral side of the fixed frame 235, thereby being configured to have a width greater than that of the bending part 1512a shown in FIG. 7.

Regarding a second fastening pin 244 and a second long hole 1512b located on the other side of the rolling part, unlike those located on one side, the second fastening pin 244 may be fixed to the flexible frame 230 and the second long hole 1512b may be formed in the back plate 1512. The second long hole 1512b and the second fastening pin 244 may be disposed to face surface direction of the rolling part, and the second fastening pin 244 may play a role as a fixed pin that fixes the fixed frame 235 to the second body 220 as well. The flexible display unit 151 may slidably move in the second direction on the flexible frame 230 by the length of the second long hole 1512b.

To enable the flexible display unit 151 to maintain a state of being spread flat, a force of pulling the flexible display unit 151 in the first direction is necessary. As shown in FIG. 8, an elastic member 236 coupled to the other side of the flexible display unit 151 may be further included. The elastic member 236 may include a tensile spring fixed to the second body 220 and fastened to the back plate 1512 of the flexible display unit 151 to apply a force in a direction of contraction.

As the flexible display unit 151 is pulled in a direction of one side in the closed state of the mobile terminal 100, the elastic member 236 is tensioned. If the mobile terminal 100 enters the open state, the flexible display unit 151 slides to move in a direction of the other side by the elasticity of the elastic member 236 so that the display unit 151 exposed externally may maintain the state of being spread flat.

As shown in FIG. 8, by bending an end portion of the other side of the back plate 1512, it is able to limit a movable range of the flexible display unit 151. The movable range can be limited in a following manner. First of all, the flexible display unit 151 is unable to further move in the direction of the other side as touching the case of the second body 220 to the right side of the drawing, and is unable to further move in the direction of the one side as touching the end portion of the fixed frame 235 to the left side of the drawing.

Although a user may pull or push the rolling part manually, there is a risk of breakage of the flexible display unit 151. Hence, a gear part 251 and a motor 252 may be further included to enable the rolling part to move in the first direction. The gear part 251 and the motor 252 are installed in the first body 210 and the motor 252 provided a rotational force to the gear part 251.

As shown in FIG. 5, a first sawteeth 231a located on the backside of the flexible frame 230 and formed on the backside of the flexible frame 230 is disposed to engage with a second sawteeth of the gear part 251.

Figure 9:
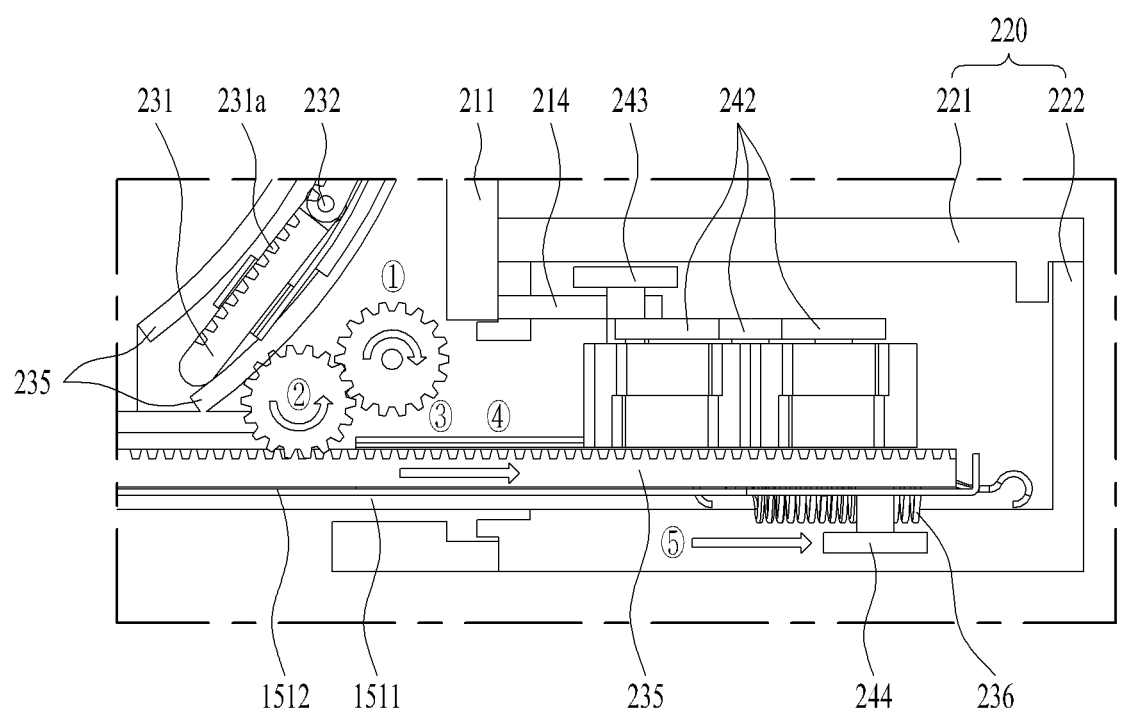
FIG. 9 is a cross-sectional diagram taken along a cutting line A-A shown in FIG. 3 (a).

FIG. 9 is a diagram to describe an operation that the rolling part of the mobile terminal 100 according to the present disclosure is unrolled, which is a cross-sectional diagram taken along a cutting line A-A of FIG. 3 (a). if the motor 252 rotates (①), the gear part 251 rotates together ⊐(②) and the gear part 251 moves the flexible plate having the first sawteeth 231a formed thereon in the first direction (③). In doing so, the flexible display unit 151 is moved as well (④) and the elastic part having the tensile force applied thereto is contracted (⑤). The rolling part may be received in or withdrawn from the first body 210 in response to a rotational direction of the motor 252 like a rack & pinion gear.

As shown in FIG. 3 (b), a support part 240 supporting the backside of the rolling part may be further included to enable the rolling part to maintain a flat state in the open state. The support part 240 includes a plurality of links 241 and a hinge 242 rotatably connecting the links 241 to change an angle in-between. In the closed state, as shown in FIG. 5, the support part 240 is folded so that the links are disposed side by side in the second direction in a state of being extended in the second direction. In the open state, the support part 240 is unfolded so that a plurality of the links 241 are disposed side by side in a state of being extended in the first direction. Among the links 241, the link 241 located at one end portion may be rotatably coupled to the first body 210 and the link 241 located at the other end portion may be rotatably coupled to the second body 220.

Figure 10:
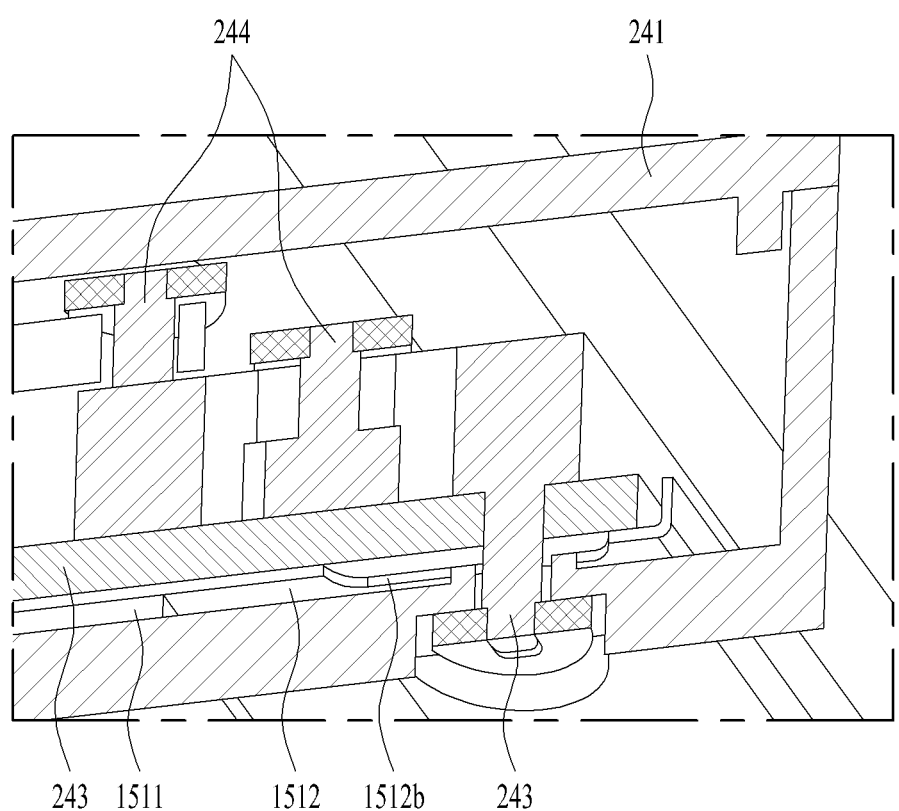
FIG. 10 is a cross-sectional diagram showing a support part of a mobile terminal according to the present disclosure.

FIG. 10 is a cross-sectional diagram showing the support part 240 of the mobile terminal 100 according to the present disclosure. The link 241 may be rotatably coupled to the second body 220 using a second fastening pin 244. Namely, the second fastening pin 244 fastens the back plate 1512 and the fixed frame 235 to each other so that they can move slidably and also couples the fixed plate to the second body 220 as well as couples the support part 240 to the second body 220. Since the second fastening pin 244 is coupled to the fixed plate, the support part 240 may maintain a state of adhering closely to the backside of the flexible plate.

A third fastening pin 243 coupling the first body 210 and the link 241 together may be configured to be projected in a direction opposite to the second fastening pin 244. In the closed state, as shown in FIG. 9, the third fastening pin 243 may be disposed at a position, in which the first body 210 and the second body 2210 overlap with each other, so as to be received in the second body 220.

Figure 11:
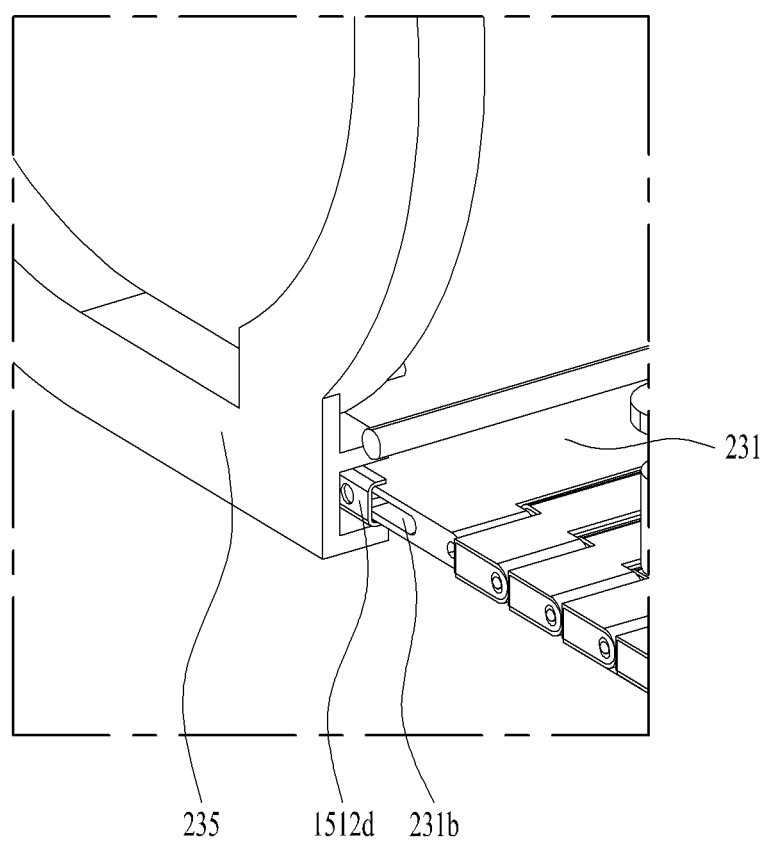
FIG. 11 is a diagram to describe a fastening mechanism of a rolling part and a guide rail and a movement of the rolling part in a mobile terminal according to the present disclosure.

FIG. 11 is a diagram to describe a fastening mechanism of the rolling part and the guide rail 235 and a movement of the rolling part in the mobile terminal 100 according to the present disclosure. The guide rail 235 may be formed on the top side and the bottom side of the receiving part. The guide rail 235 may have a groove shape that is open toward the rolling part and, as shown in FIG. 4, may be configured in a circular or spiral shape. Both ends of the rolling part is inserted in the guide rail 235, and the rolling part may move along the guide rail 235.

Referring to FIG. 4, the rolling part may be located on an outer circumferential portion of the receiving part and a battery, a main board and the like may be installed in the inner space thereof. Namely, the receiving part may include a first receiving part receiving the rolling part therein and a second receiving part located inside the first receiving part to receive other components therein, and may further include an inner case (not shown) partitioning the receiving part into the first receiving part and the second receiving part. As shown in FIG. 4, a speaker hole is formed in one of the top and bottom cases of the first body 210 and an audio output unit outputting sound through the speaker hole may be further included. A camera may be installed in the second body 220 to enable a user to take a shot while viewing the display unit 151. A plurality of the cameras may be installed in the second body 220 so that a user can take shots in various directions in a manner that the cameras are appropriately disposed on the front side and the backside of the second body 220. As described above, in the rollable mobile terminal 100 according to the present disclosure, the flexible display unit is stably supported even in a state that the flexible display unit is unrolled. Therefore, although the rollable mobile terminal 100 is held with one hand, the display device is supported and a touch input and the like can be performed.

Furthermore, it is able to compensate for a length tolerance between a rolled state and an unrolled state, thereby solving thereby solving a problem that a display unit is cleaved, loosened or broken.

The above detailed description should not be construed as being limitative in all terms, but should be considered as being illustrative. The scope of the present invention should be determined by reasonable analysis of the accompanying claims, and all changes in the equivalent range of the present invention are included in the scope of the present invention.

What is claimed is:

1. A rollable mobile terminal, comprising:
   a rolling part including a flexible display unit and a flexible frame located on a backside of the flexible display unit, the flexible display unit and the flexible frame stacked in a first direction;
   a first body including a receiving part configured in a cylindrical shape so that a first end of the rolling part is rolled up and received therein and an opening formed in a side so that the rolling part is inserted or withdrawn through the opening; and
   a second body coupled with a second end of the rolling part,
   wherein the rollable mobile terminal is switchable to a closed state that the rolling part is received in the first body and that the first body and the second body are closed or an open state that the rolling part is withdrawn externally and that the first body and the second body are spaced apart from each other in a second direction,
   wherein a fastening part connected to a lateral edge of the rolling part fastens the flexible frame and flexible display unit together to enable the flexible display unit to slidably move in the second direction, and
   wherein the fastening part comprises a pin extending in a third direction and a hole receiving the pin, wherein the fastening part includes a bending part extending from the flexible display unit in the first direction, wherein the hole is formed in the flexible frame, and wherein the pin is fixed to the bending part.

2. The rollable mobile terminal of claim 1, wherein the flexible display unit comprises a display panel outputting an image and a back plate coupled to a backside of the display panel and wherein the fastening part fastens the flexible frame and the back plate of the flexible display unit together to enable the flexible display unit to slidably move in the second direction.

3. The rollable mobile terminal of claim 2, wherein the fastening part comprises:
   the hole extended long in the second direction; and
   the pin inserted in the long hole.

4. The rollable mobile terminal of claim 2,
   wherein the fastening part comprises the bending part extended in the first direction from each end of the fastening part to enclose the lateral edge of the rolling part.

5. The rollable mobile terminal of claim 2, further comprising an elastic member inserted between the second body and the back plate to pull the back plate in a direction of the second body.

6. The rollable mobile terminal of claim 1, the flexible frame comprising:
   a plurality of unit frames extended in a third direction and disposed side by side in the second direction; and
   a plurality of hinge pins connecting a plurality of the unit frames in between, respectively.

7. The rollable mobile terminal of claim 6, wherein the flexible frame further comprises a plate-type fixed frame located on an end portion in the second direction and wherein the fixed frame is fastened to the second body.

8. The rollable mobile terminal of claim 6, comprising:
   a first sawteeth formed on a backside of each of a plurality of the unit frames;
   a gear part located at the gear first body and comprising a second sawteeth engaging with the first sawteeth to rotate; and
   a motor providing a rotational force to the gear part.

9. The rollable mobile terminal of claim 1, further comprising a guide rail formed on at least one of a top side and a bottom side of the receiving part in the cylindrical shape to guide a moving direction of the rolling part by being slidably coupled to both end portions of the rolling part,
   wherein the guide rail is configured in a circular or spiral shape.

10. The rollable mobile terminal of claim 1, comprising a support part having one end coupled to the first body and the other end coupled to the second body to support a backside of the flexible frame.

11. The rollable mobile terminal of claim 10, the support part comprising:
   a plurality of links; and
   a hinge coupled between a plurality of the links to vary an angle in between.

12. The rollable mobile terminal of claim 11, wherein the support part is folded in the closed state in a manner that a plurality of the links are extended in a third direction and disposed side by side in the second direction, and
   wherein the support part is unfolded in the open state in a manner that the link is extended and unfolded in the second direction.

13. The rollable mobile terminal of claim 1, wherein the first body comprises an opening configured to expose a portion of the flexible display unit in the closed state and wherein state information of the mobile terminal, time information or user-set information is outputted to a position exposed through the opening.

14. The rollable mobile terminal of claim 1, the receiving part in the cylindrical shape comprising:
   a first receiving part located on an outer circumference to receive the rolling part therein; and a second receiving part located inside the first receiving part to receive a battery therein.

15. The rollable mobile terminal of claim 14, further comprising:
a speaker hole formed in at least one side of the first body in a third direction; and
an audio output unit received in the second receiving part to output sound through the speaker hole.

16. The rollable mobile terminal of claim 3, wherein the long hole is elongated along the lateral edge of the rolling part.

17. The rollable mobile terminal of claim 1, wherein the hole is oblong and a longer dimension of the hole extends in the second direction.

* * * * *